UNITED STATES PATENT OFFICE.

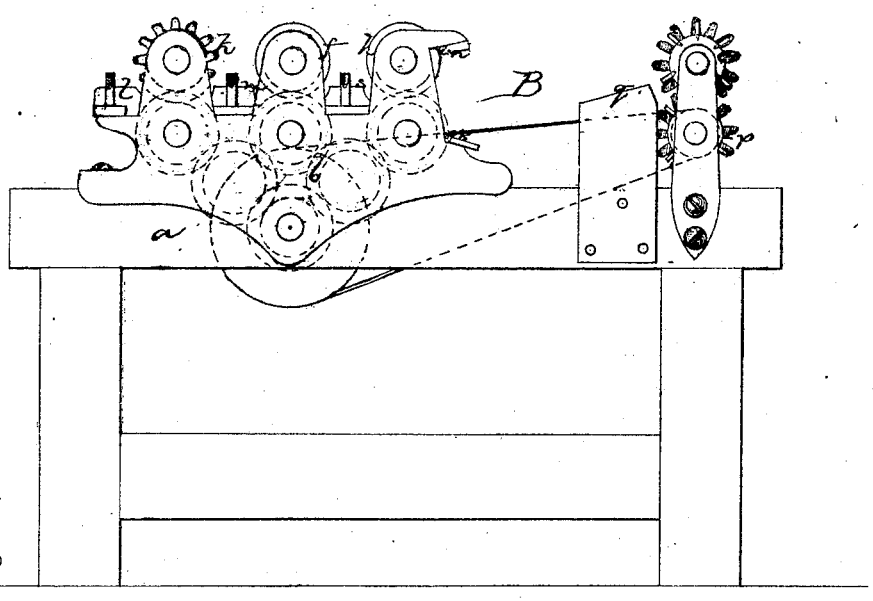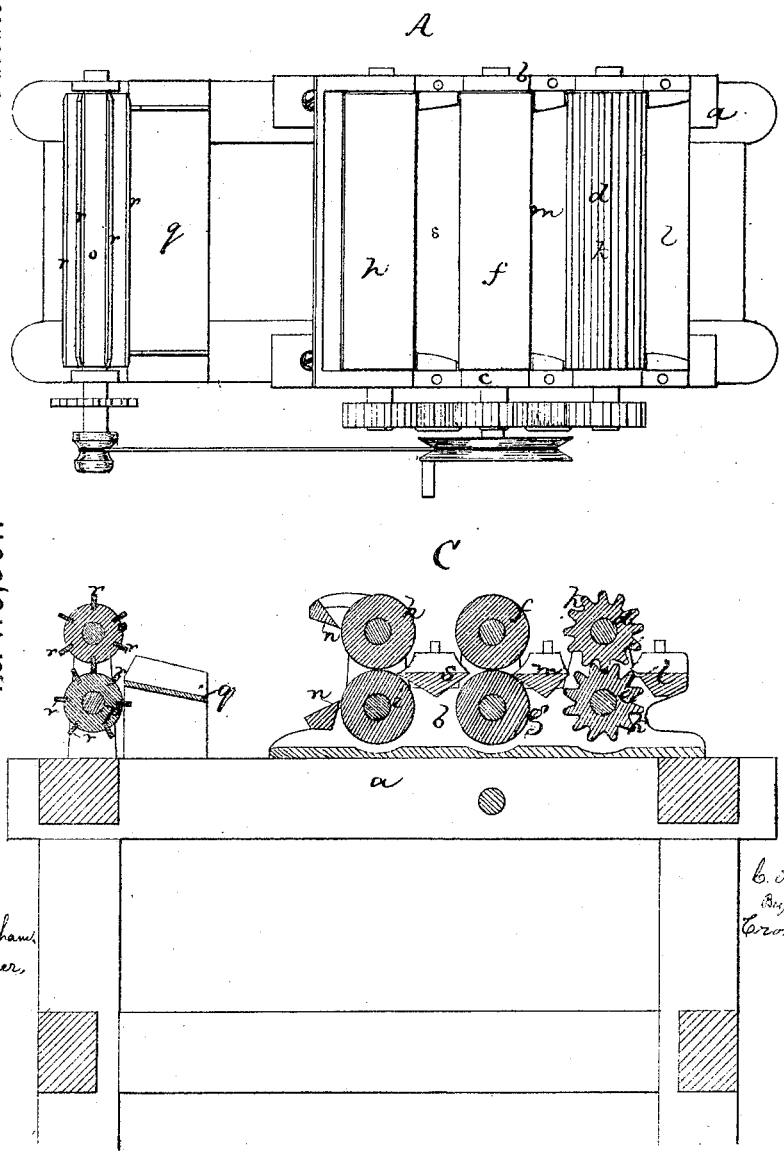

CHARLES A. DEAN, OF BOSTON, MASSACHUSETTS.

IMPROVEMENT IN FIBER-CLEANING MACHINES.

Specification forming part of Letters Patent No. 118,591, dated August 29, 1871.

*To all whom it may concern:*

Be it known that I, CHARLES A. DEAN, of Boston, in the county of Suffolk and State of Massachusetts, have invented an Improved Machine for Cleaning Sisal-Grass, &c.; and I do hereby declare that the following, taken in connection with the drawing which accompanies and forms part of this specification, is a description of my invention, sufficient to enable those skilled in the art to practice it.

My invention relates to the construction and arrangement of mechanism for treating sisal-grass and similar fibrous pulpy leaves or stems of plants to free the fibers from the pulp or pith in such manner as shall save the most of the fibers and leave them in good condition for the action of the hackling-machine.

In my improved machine I employ a pair of toothed fluted rolls, between which the leaves or stems are first passed, the teeth of these rolls meshing, and each tooth in its revolution reaching to or nearly to the bottom of the flute into which it meshes, so that the rolls break up the pith part of the leaf into pieces, detached so far as the pith is concerned, or united only by the fibers, next to which rolls is a pair of presser-rolls, between which the broken pithed leaves pass from the breaker-rolls, and by which the juices and water are expressed from the leaf, the leaf passing from these through another pair of similar pressure-rolls, by the action of which the pithy sections are compressed and compacted or solidified, and thence through a pair of wiper, duster, or scraper-rolls, by which the pithy or cakey portions freed from liquid, and only held together and to the fibers by the latter passing into and through them, are drawn or scraped from the fibers, leaving the latter clean, and saving in a good condition all or very nearly all of the fibers of every leaf. It is in this organization that my invention consists.

The drawing represents in plan, in side elevation, and in vertical section, at A, B, and C, respectively, a machine embodying my invention.

$a$ denotes a frame-work, on the top of which are two housing-frames, $b\ c$, in which are journaled the shafts or gudgeons of three pair of rolls, $d\ e, f\ g$, and $h\ i$—$d\ e$ denoting the first pair, $f\ g$ the second, and $h\ i$ the third pair of said rolls. The rolls $d\ e$, which may be called the breaking-rolls, are fluted, and their teeth $k$ mesh, as seen at C. The shaft of the lower roll $e$ carries at one end a gear-pinion, which meshes into and drives a similar pinion on the upper roll. In the plane of junction of the two rolls is a guide-table, $l$, over which the grass is presented to the teeth of the rolls, and by these teeth the grass is drawn through the rolls, and as it passes through them the teeth cut the thick soft pith into pieces without breaking the fibers of the leaf. From these rolls the broken leaves pass forward over a guide, $m$, to the expressing-rolls $f\ g$, which, biting upon or seizing the grass, compress the pith between them, and express or expunge therefrom all or nearly all the water or other liquid juicy matter contained in the leaf. After the immediate expression of the juices the pith is left in a spongy or puffy condition, but contains viscid or glutinous matter in such quantity that when the leaf reaches the third pair of compressor-rolls $h\ i$, to which it passes from the rolls $f\ g$ over a guide or table, $s$, which rolls $h\ i$ may be termed the compacting or solidifying-rolls, by their action upon the leaf condensing the pith, forming it into hard or compact and solid sections, still joined by the fibers. In the action of the rolls $h\ i$ upon the glutinous pith the viscid pulp adheres more or less to the surfaces of the rolls, and to remove such matter therefrom each roll is provided with a stationary scraper, $n$, the edge of which is in close contiguity with the surface of the roll, so as to effect the removal therefrom of all adhering matters. From the rolls $h\ i$ the leaf passes over a guide or table, $q$, to a pair of wiper or duster-rolls, $o\ p$, which rolls are placed at some distance in front of the rolls $h\ i$, but at such distance that the ends of the leaves pass into or between them before the opposite ends leave the rolls $h\ i$. These rolls are driven at a great speed relatively to the speed of the rolls $h\ i$, and each roll is made with a series of longitudinal flexible scrapers or wipers, $r$, inserted in the surface of the rolls and projecting therefrom, as seen at C. These wiper-blades draw the leaves through them, but only so fast as permitted by the hold of the rolls $h\ i$ thereupon, and by their speed they draw off from the fibers the solid pithy portions, cleaning and freeing the fibers therefrom. By their action they also draw out or straighten the fibers, so that the assemblages of fibers leave the machine in parallel or straightly arranged masses, having been cleaned almost entirely from all pithy or pulpy matters, and having suffered but very slight loss of fibers, the action of the machine having no tendency to destroy or break, or discard any of the fibers. The working of the second or expressing-rolls upon the bruised and semi-liquid pulp formed by the breaker-rolls has a tendency to wash the fibers by such juice, and to clean, brighten, and bleach them, the coloring matter falling with the expressed liquid. The three pairs of rolls, $d\,e$, $f\,g$, and $h\,i$, are preferably driven at the same speed, the train of gearing being denoted by dotted lines at B. To guide the leaves properly in and to the action of the respective rolls, each table or horizontal guide-plate $l\,m\,s$ has at its ends (and may have between such ends) vertical guides or directing-walls, $t$, by means of which the leaves are kept from running to the ends of the rolls, and, when the intervening vertical guides are used, from contact or entanglement one with another.

I claim—

1. The breaker-rolls $d\,e$, expressing-rolls $f\,g$, and compacting or condensing-rolls $h\,i$, relatively arranged and combined, substantially as shown and described.

2. The wiper or scraper-rolls $o\,p$, in combination with the breaking, expressing, and condensing-rolls, substantially as shown and described.

CHARLES A. DEAN.

Witnesses:
FRANCIS GOULD,
M. W. FROTHINGHAM.